United States Patent [19]

Eldridge

[11] 3,832,733

[45] Aug. 27, 1974

[54] MANUAL INPUT RECORDATION OF DATA AND COMPLEMENT

[75] Inventor: Brice Eldridge, New York, N.Y.

[73] Assignee: Telewave Systems, Inc., New York, N.Y.

[22] Filed: Sept. 12, 1973

[21] Appl. No.: 396,476

Related U.S. Application Data

[63] Continuation of Ser. No. 236,262, March 20, 1972, abandoned.

[52] U.S. Cl. .......... 360/4, 197/9

[51] Int. Cl. .......... G11b 5/02

[58] Field of Search .......... 340/174.1 B, 174.1 G, 340/146.1 BE; 235/61.12 M; 345/74 M; 101/90; 197/9

[56] References Cited

UNITED STATES PATENTS

| | | | |
|---|---|---|---|
| 3,045,218 | 7/1962 | Brand | 101/90 |
| 3,238,501 | 3/1966 | Mak et al. | 340/174.1 |
| 3,557,927 | 1/1971 | Wright | 197/9 |

*Primary Examiner*—Vincent P. Canney
*Attorney, Agent, or Firm*—Dike, Bronstein, Roberts & Cushman

[57] ABSTRACT

A recording mechanism and method for providing data and data signals representative of the depression or non-depression of a plurality of keys of a keyboard of a shorthand machine, said mechanism including means for detecting and storing in parallel information representing the depression or non-depression of said keys, means for sensing the completion of a stroke of said keys and means responsive to the sensing of the end of the stroke to serially shift out the stored parallel information to generate and record data and data signals on a movable recording media.

19 Claims, 6 Drawing Figures

PATENTED AUG 27 1974

3,832,733

SHEET 2 OF 3

MANUAL INPUT RECORDATION OF DATA AND COMPLEMENT

This is a continuation of application Ser. No. 236,262, filed on Mar. 20, 1972, now abandoned.

BACKGROUND OF THE DISCLOSURE

This invention is directed to recording of data signals on a recording media and is more particularly directed to a new and improved data recording mechanism and method for detecting and then recording data representative of a change of state of a source such as caused by the actuation of one or more keys of a stenographic machine, typewriter, etc., or other signal source.

The present invention finds particular utility when used in conjunction with stenographic or shorthand machines commonly used by court stenographers in judicial proceedings or in other situations e.g., at conferences where an acturate typewritten or printed transcript of the spoken word is desired.

At the present time, court stenographers generally produce a tape (e.g., paper) having symbols (as a result of key depression) respresenting in a coded form a transcript of proceedings such as a deposition. Thereafter, the stenographer must take the tape and transcribe it to prepare a typewritten transcript.

Although this procedure has been used for years, there is understandably a significant amount of delay between the time the data is recorded on the tape until the time it may be transcribed. In some situations this delay may be acceptable but in other cases, such as where a trial is in progress and each days testimony must be reviewed prior to the next day in court, rapid turn-around in the production of the written transcript is imperative.

Accordingly, there has developed a need for a new and improved system and method for generating from a keyboard or simlar device means for rapidly converting coded data being recorded to a written (e.g., typewritten) format (in English or some other language).

The present invention provides one part of such a system and in particular provides means for generating on a recording media (e.g., magnetic recording media) a representation of data being taken down stenographically.

This recording media may then be used directly by a machine to produce a typewritten record of the information taken down stenographically. The data recorded on the recording media may also be used simply as a secondary or duplicate storage of data being stenographically recorded on the paper tape.

This data may also be used to reproduce the paper tape when used in conjunction with a decoder if the paper tape is destroyed.

The mechanism of this invention may be incorporated into a stenographic or other machine as an attachment thereto or may be used in its own right to record data.

For a more complete description of the stenographic machines or other machines which may be used in conjunction with the present invention reference may be had to the following U.S. Pat. Nos. 2,912,090; 3,557,927; 2,855,082; 2,319,273; 1,280,743; 1,913,831; 3,260,340; 3,413,624; 3,197,618; 3,305,062; 3,372,865; 2,593,371; 3,225,883; and 2,390,414 all of which are incorporated by reference herein by reference hereto.

Reference may also be had to some of the aforementioned patents for the description of various recording techniques.

SUMMARY OF THE INVENTION

A recording mechanism and method for recording DATA and the logical inverse of DATA ($\overline{DATA}$) based on signals provided from a source, storage means for storing the data, means responsive to the storage means for developing DATA and $\overline{DATA}$ signals and recording the same on a recording media, and means for stepping or moving the recording media after or while recording the DATA and $\overline{DATA}$ signals. In the preferred embodiment the data signals result from the depression of one or more keys per stroke of a device such as a shorthand machine and represents a word or a part of a word. The data signals are stored in storage means and after the release of all keys are then transferred in parallel into a shift register. Thereafter, the data in the shift register is serially shifted out of said shift registers to develop DATA and DATA signals which are recorded on a magnetic tape being stepped one step at a time in synchronization with the DATA and DATA signals being developed for recording. The preferred embdiment provides means for detecting an end of a stroke which initiates the above sequence of events by starting a clock and a counter.

The DATA and not DATA ($\overline{DATA}$) signals recorded in the preferred embodiment are recorded on two tracks (called DATA and $\overline{DATA}$) of the tape with either the DATA or $\overline{DATA}$ signals being recorded per each step of the tape. In addition, parity bits are developed and recorded. Preferably in this mechanism an even number of bits which includes parity bits are recorded in each track for each stroke of the keys by the user of the machine.

DETAILED DESCRIPTION OF THE PREFERRED EMBODIMENT OF THE DISCLOSURE

Figures 1, 3, 4, 5:
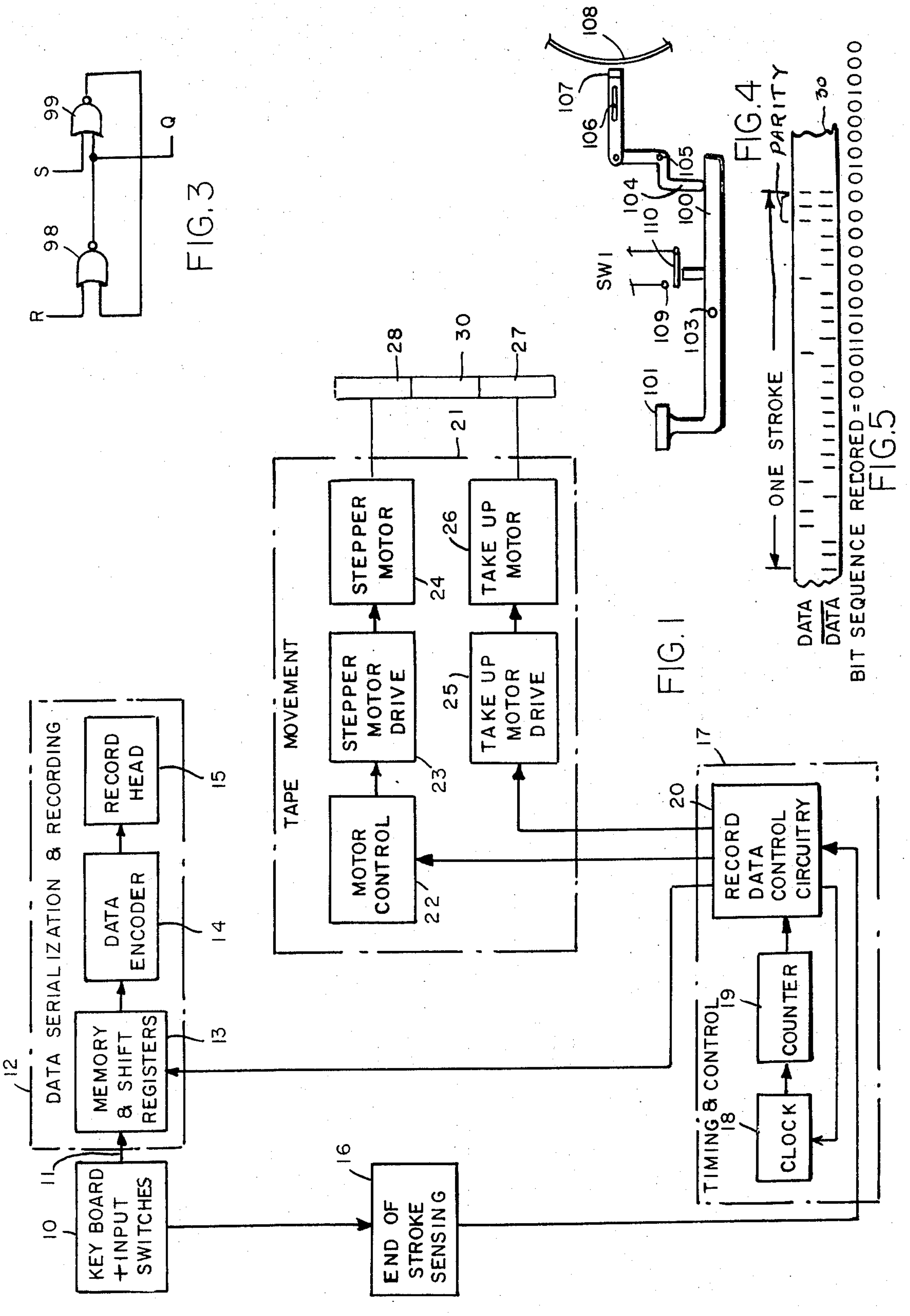
FIG. 1 is a block diagram illustrating the recording system of the invention.
FIG. 4 is a diagrammatic view of one key of the keyboard disclosed in FIG. 1 for actuating the switches shown in FIGS. 2A and 2B.
FIG. 3 is a logic diagram illustrating a typical latching device suitable for use in FIGS. 2A and 2B.
FIG. 5 illustrates a tape having both DATA and $\overline{DATA}$ bits recorded thereon as well as parity bits.

Reference should now be had to FIG. 1 for a brief description of the preferred embodiment of the invention shown in block form. The general purpose of the preferred embodiment is to record on a recording media such as a magnetic tape a set of pulses which reliably indicates which keys have been depressed on a machine to record data, as for example the keys of a shorthand machine. For the purposes of describing this invention, it will be assumed that a shorthand machine is in fact being utilized and that the present invention is used as an attachment thereto.

In addition, for purposes of explanation, the described mechanism records on magnetic tape information corresponding to those shorthand keys depressed during a stroke. A stroke is defined as being whenever any key is depressed, continuing while at least one key is depressed (not necessarily the same key throughout the stroke), and ending whenever the last key is released.

The input comprises as shown in block 10, a keyboard representing a keyboard of a shorthand machine, and including a plurality of switches (one for each key) for providing a voltage signal or an input line 11. (actually representing a plurality of lines). When an input line goes high (e.g., by the switch coupled thereto closing) during a stroke, this event is stored in a plurality of memory latching flip-flops whose outputs are coupled to shift registers, all of which are shown in the block 12 entitled data serialization and recording and shown at 13.

As used herein the term high means there is provided a sufficient voltage to switch a logic gate and the term low is equivalent to 0 volts (ground).

At the end of the stroke, the stored information, which has been entered into this shift register as 24 parallel inputs indicating whether or not a key was depressed, is shifted out of the shift register in serial form into a data encoder 14 and thence recorded by a two track recording head 15 on magnetic tape shown at 30 in FIG. 5.

In order to initiate the recording of data, there is provided at 16 a block entitled End of Stroke Sensing which recognizes when all keys have been released, and the inputs have returned to their initial state.

The signal from block 16 is then fed to block 17 entitled Timing and Control, and in particular into record data control circuitry 20 to start the clock 18 to initiate counting by the counter 19.

The counter initates the serial shifting out of data from the shift registers 13 into data encoder 14 where DATA, $\overline{DATA}$ (compliment or logical inverse of DATA is generated) and parity or check bits are generated and then recorded by the recording heads 15 on tape 30.

In addition, control signals are provided from record data and control circuitry 20 to cause the take-up motor drive 25 to initiate rotation of take-up motor 26 to drive take-up reel 27.

Further, the record data and control circuitry provides control signals to cause a stepper motor 24 through a motor control 22 and stepper motor drive 23 to rotate reel through a convential capstan 28 to step the tape 30 past the recording heads, the recording head being positioned to record information signals as well as parity or check signals on two parallel channels DATA and $\overline{DATA}$.

To better understand the principal of operation of the recording mechanism and method of this invention a brief description of data coding is given below while reference is made to FIG. 5.

FIG. 5 shows generally a tape having a plurality of bits encoded therein on one track called a DATA track and on another track called a $\overline{DATA}$ track.

Since a particular magnetic state change or flux change indicates the presence of a "1"(a 1 indicating key depression) the visible marks on the tape (see FIG. 5) in the particular track merely indicates that a bit representing a 1 has been encoded. The absence of a mark indicates that a "0"has been encoded, by providing a constant magnetic state on the tape, i.e., current flow through recording coil of the head 15.

Thus, in FIG. 5 on the DATA channel the bit sequence 000110100000000100001000 would be encoded and recorded as shown and the $\overline{DATA}$ track would also be encoded and recorded as shown. It depending upon the recording system a 0 bit may or may not be specifically encoded (if it is assumed that the tape is initially magnetized in a predetermined state) while encoding of a 1 bit will always take place.

The data is encoded as follows on the two recording tracts: since the preferred system described herein has 24 input switches and thus 24 input lines, a group of 24 bits, corresponding to the stae of the 24 input lines during a stroke, is shifted serially out of the shift registers.

If the first bit is a 1, then a pulse is recorded on the DATA track; if it is a 0, then a pulse is recorded on the $\overline{DATA}$ track; after or while a pulse is recorded, the magnetic tape is incremented a small distance to enable the recording of the second bit in the same manner as the first. A pulse may be recorded while the tape is moving or while it is stationary. This shifting continues until all 24 bits have been recorded. Then either three or four parity bits are recorded on both DATA and $\overline{DATA}$ tracks, depending on the number of bits previously recorded per track in the group of 24 bits. This maintains even parity, such that the number of pulses recorded on either track within the group comprising a stroke added to the number of parity pulses will always equal an even number. The parity pulses also delineate between strokes and provide a means of measuring recorder performance by measuring the length between the pulses, and alignment between pulses on the tracks.

With the above coding technique, many different types of errors on the magnetic tape can be detected and in many cases corrected, providing increased accuracy and utilization over non-redundant recording techniques. In addition, by combining DATA and $\overline{DATA}$ track information clock pulses may be derived for decoding the data.

Figure 2A:
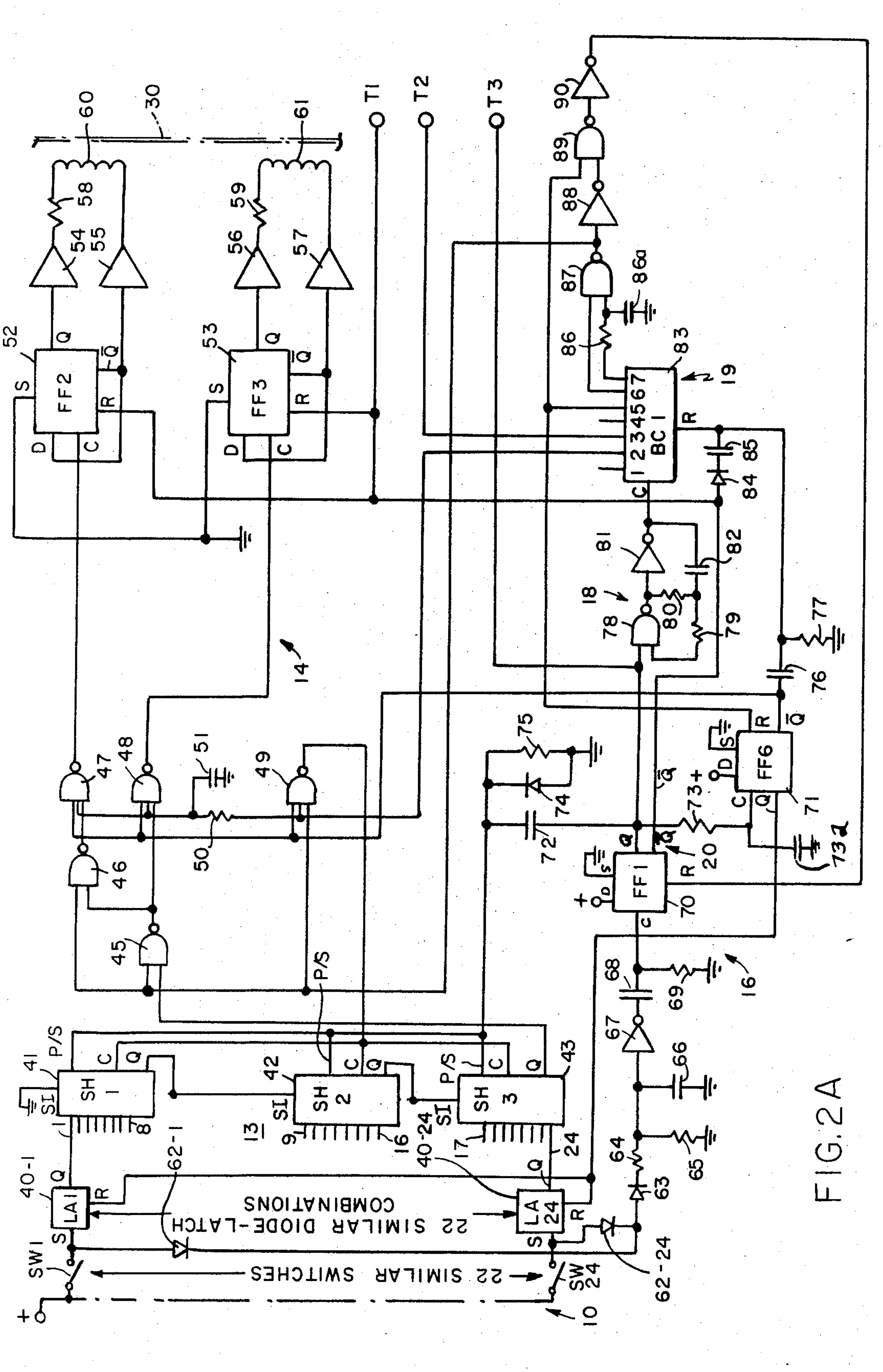
FIGS. 2A and 2B are a more detailed diagram partially logical block and partially circuit for implimenting the recording system of the invention.
Figure 2B:
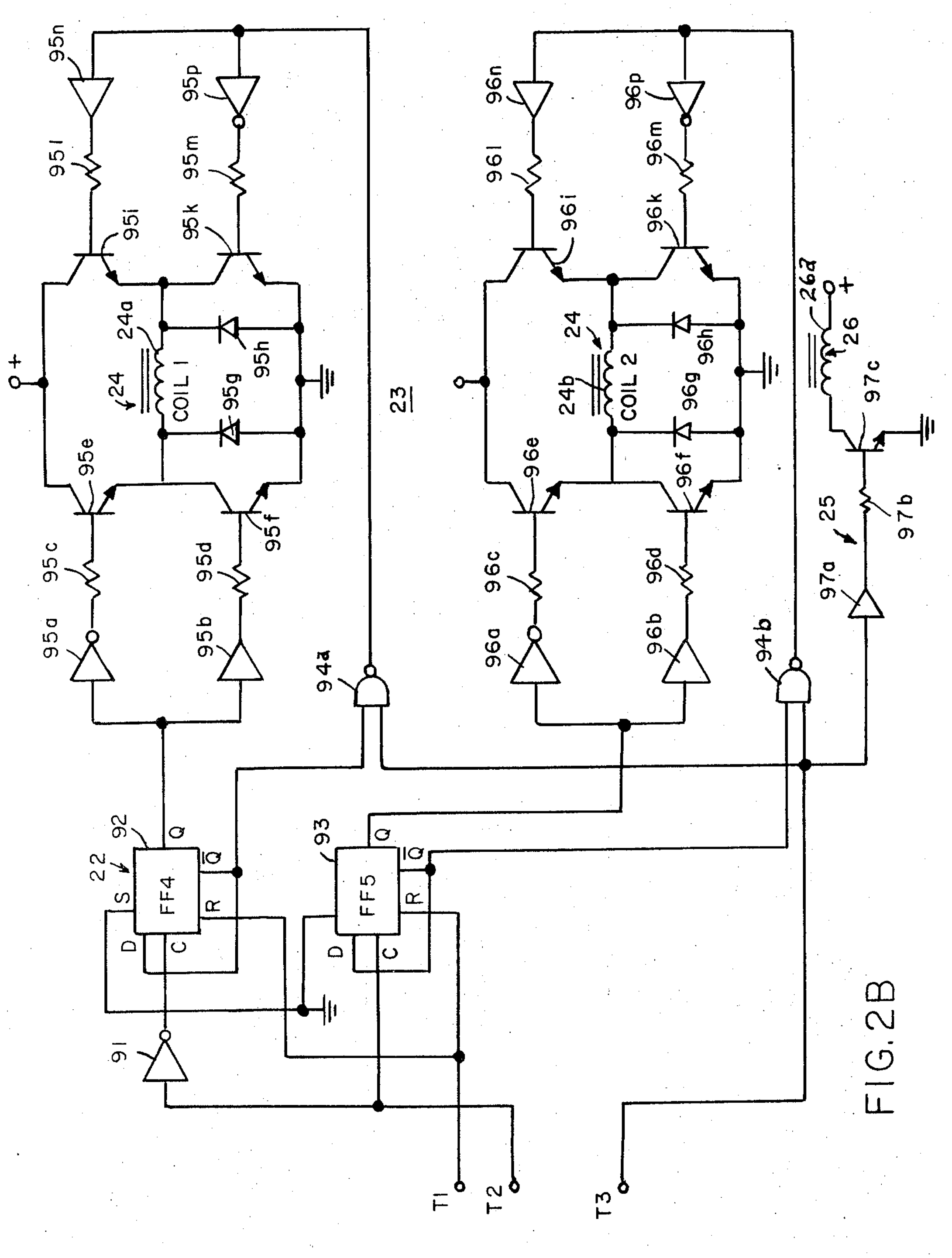

Reference should now be had to FIGS. 1, 2A and 2B for a description of the general sequence of events.

Whenever any switch SW is closed, the corresponding latch LA stores this fact as a high or logical 1 signal, even after the switch is opened. When the last switch is opened, indicating the end of a stroke, a pulse sets the "Q" output of flip-flop FF1, shown at 70, high. A very short pulse is issued to the parallel serial (p/s) input of the shift registers 41–43 which loads the resulting logical states of the latches 40 into the shift registers 41–43. A group of bits representing the logical state of the switches SW1-SW24 is now in the three shift registers 41–43. Flip-flop FF6 (number 71) is then set, which resets the latches 40 to ready them for storage of the next stroke's input.

The output of flip-flop FF1 starts the internal timing clock 18 the tape take-up motor 26 and enables the stepper drive circuitry 23. The binary counter BC1 (number 19) divides the clock signal into pulses occurring at different times. The stepper motor 24 rotates a predetermined amount in response to the output of each binary counter (output "3") pulse. After four initial steps, the counter output resets flip-flop 71. Once flip-flop FF6 is reset, each time the counter causes the motor to be stepped, one bit is shifted out of the shift register and gated to either the DATA or $\overline{DATA}$ track depending on whether it is a logical 1 or 0 respectively.

This stepping and recording continues until 24 bits have been recorded onto the tape in a particular format. The tape is stepped four more positions during which time either three or four pulses are simultaneously recorded on both tracks. The number of pulses will be such that the sum of all the pulses on either track during the stroke will be even, and hence even parity. Once the parity bits are recorded, all flip-flops are reset, the motors stopped, and the system is ready to record the next 24 bits of information describing the next stroke.

More than one data pulse can be recorded during a single motor step and the number of steps varied so that a variety of patterns may be recorded using the aforementioned encoding technique.

In the preferred embodiment herein Complementary-Symmetry/Metal-Oxide-Semiconductor (COS/MOS) logic is used. The fundamental difference between this type of logic and Transistor/Transistor Logic (TTL) elements is the fact that TTL circuits are essentially current switching circuits. COS/MOS circuitry is voltage dependent and utilizes very little current at the logic inputs and outputs. This enables the simple design of particular circuits that would otherwise be more involved using TTL elements. Such COS/MOS circuitry may be purchased from RCA as the CD 4,000A Series.

Reference should now be had to FIGs. 2A and 2B for a detailed circuit description of the invention.

The input to the recorder is a voltage produced by moving a key arm sufficiently or some other device. While the actual mechanism may be a mechanical switch, reed switch or other source capable of producing a voltage under the proper conditions, the symbol indicating this input mechanism is shown on the circuit diagram as a switch SW. Since there are 24 input lines, there are 24 switches (SW 1 – SW 24), 24 diodes (62 – 1, 62 – 24), and 24 latches (LA 1 – LA 24 numbered 40 – 1 to 40 – 24). For simplicity, only one set that is switch SW – 1, diode 62– 1 and latch 40 – 1) shall be described, as they all perform identically.

When a switch SW 1 closes, voltage is connected to input S of the latch 40–1. The latch output Q goes high and remains in that state until the latch reset input "R" goes high. Voltage also passes through a diode 62–1, which serves to isolate latch 40–1 from other latch inputs, through a diode 63 and a resistor 64 to the inverter 67. A capacitor 66 provides a means for eliminating erratic pulses from the switch contacts by requiring a certain time interval to charge the capacitor 66 through a resistor 64 before a voltage level sufficient to switch the logic state of the inverter 67 is achieved. The resistor 65 provides for discharging the capacitor 66 when the voltage is removed. In effect, the capacitor 66 and the resistor 65 form a time delay mechanism, and since it is used often, the method of operation hereafter refers to this description.

The high signal at the input of the inverter 67 causes a transition at the output from high to low which coupled through capacitor 68 produces a negative going pulse edge to flip-flop 70 at the clock (C) input. This negative going pulse edge has no effect. Resistor 69 maintains the potential at the clock input at zero potential when no signal is present. However, when the last switch for example SW 24 opens and capacitor 66 discharges through resistor 65, the output of inve;ter 67 goes high and a positive going pulse edge is coupled through capacitor 68 to the clock input of flip-flop 70. This causes flip-flop 70 to change its output state Q which becomes high. Flip-flop 70 will stay in this switched state until all necessary shifting, recording and tape motion has taken place for the stroke, and will then be reset and ready to record another stroke of information. This entire process of recording a stroke starts at the end of a stroke (when an individual after depressing at least one key of a machine releases all of the keys) and is completed before the end of the next stroke.

When the output Q of flip-flop 70 goes high, five operations take place: (1) an oscillator acting as a clock producing equally spaced pulses is started; (2) the take-up motor coil is energized; (3) the stepper motor drive circuitry 23 is enabled; (4) a pulse is directed to the shift registers 41–43 parallel/serial P/S controls to clock in the data stored in the latches 40–1 to 40–24; (5) flip-flop 71 is set. These operations will be considered one at a time.

It should be understood that points $T_1$, $T_2$ and $T_3$ in FIGS. 2A and 2B are connected to each other and were only broken because of the necessity of placing the figure on two sheets.

1. NAND gate 78, inverter 81, capacitor 82 and resistors 79 and 80 form an astable oscillator or clock 18. This clock produces a square wave at inverter output 81 and provides the timing signal upon which the recording sequences are based. The clock 18 operates as follows: Before the flip-flop 70 output Q goes high, NAND gate 78 input attached thereto is low. Therefore, the NAND gate 78 output is high, which causes the inverter 81 output to be low, and causes through resistors 79 and 80 the NAND gate input attached thereto to be high. When the flip-flop 70 output Q goes high, NAND gate 78 input attached thereto goes high and NAND gate 78 output goes low as does inverter input 81. When the output of the inverter 81 is high, capacitor 82 becomes positively charged. As a result, the input of the NAND gate 78 attached thereto through resistor 79 is high and its output is low. Since resistor 80 is connected between the charged capacitor 82 and the output of the low NAND gate 78 it provides a path to ground which discharges the capacitor 82. As long as the NAND gate output 78 is low, the output of the inverter 81 is high. However, as capacitor 82 discharges, the voltage at the NAND gate input coupled to resistor 79 also begins to drop. When the voltage approaches the transfer point at which the NAND gate 78 switches logic states, the NAND gate 78 output becomes high: as a result the output of the inverter becomes low and capacitor 82 becomes negatively charged or low. Resistor 80, connected to the now high output of the NAND gate 78, provides a path by which capacitor 82 charges. As the capacitor 82 voltage reaches the transfer point of the NAND gate input, coupled to resistor 79, the circuit again changes state, and the inverter output goes high. This cycle repeats itself until the Q output of the flip-flop 70 goes low.

2. The high Q output of the flip-flop 70 causes a high output at buffer 97*a* which through current limiting resistor 97*b*, switches transistor 97*c* into the conducting state and causes current to flow through the take up motor coil 26*a*. The take-up motor 26 is energized throughout the recording of each of the strokes to provide torque to drive the take-up reel 27 to collect the recorded tape. The take-up reel being conventional and shown in a top view thereof of FIG. 1.

3. The high Q output of the flip-flop 70 also enables the stepper motor drive circuitry 23 by making an input of each of the NAND gates 94*a* and 94*b* high.

4. As the output Q of flip-flop 70 goes high, capacitor 72 becomes positively charged, producing a pulse at the parallel/serial P/S inputs of the shift registers 41 – 43 to cause them to go high. When a parallel/serial input P/S is low, a shift register shifts bits from the serial input S1 towards the output Q. The shift registers 41–43 are eight state shift registers conventional in the art and may be purchased from RCA the trade designation CD 4021A. A bit shifts one stage for each positive going pulse edge to the clock "C" input of each shift register. While a parallel/serial input P/S is high, the logic state at any parallel input of the shift registers labelled 1–24 (coupled to the latches 40) is loaded into the shift register position corresponding to the particular parallel input. Since the shift registers indicated here are eigh position registers, it takes eight pulses to shift a bit from the serial input to the output. There are also eight parallel inputs for each of the three shift registers. These parallel inputs are labelled 1 through 24, indicating that they handle the resultant logic states of switches SW1 through SW24. Register 75 maintains the parallel/serial inputs P/S of the shift registers at ground level when no signal is present. In addition, diode 74 provides a path to ground for the negative pulse when capacitor 72 discharges as flip-flop Q output 70 goes low.

5. When the Q output of the flip-flop 70 becomes high, capacitor 73*a* begins to charge through resistor 73. When the transfer point for the clock C input to flip-flop 71 is reached, the flip-flop Q output becomes high, and resets all the latches 40-1 to 40-24 (LA 1 through LA 24), by having the latch reset R become high. This delay (caused by charging of 73*a*) insures all the latch outputs have been loaded into the shift registers before the latches are reset.

The seven stage binary counter 83 serves to divide the clock pulses from the output of inverter 81 such that two pulses at the input of any counter stage produces one pulse at the output of that stage. Therefore, 128 clock pulses at the input to the binary counter 83 produces 1 pulse at the output of the last stage labelled 7. The various outputs labelled 1–7 of the binary counter 83 direct the sequence of the circuitry, with the output from the second stage (output 2) providing the basic timing pulses. Since the negative going edge of a pulse triggers the logic states within the binary counter, the output "5" from stage five becomes high after the fourth pulse at the stage two output 2, (or the 16th clock pulse). This stage five output resets flip-flop 71 which in turn causes a positive pulse from $\overline{Q}$ of flip-flop 71 to be coupled through capacitor 76 and reset the binary counter 83 by applying a signal to the "R" input thereof.

Resistor 77 maintains ground potential at the binary counter 83 reset input R when no signal is present. Diode 84 keeps the reset pulse $\overline{Q}$ from flip-flop 71 from coupling through capacitor 85 to the rest of the circuit. Therefore, following four pulses from the second stage (output 2) of the binary counter 83 which produces an output at 5 thereof both flip-flop 71 and the binary counter 83 itself are reset.

During these four pulses, or 16 input clock pulses, the binary data stored in the latches has been loaded into the shift registers, the latches reset, the tape moved four positions by the stepper motor drive circuitry as will be described later and the binary counter reset.

While the $\overline{Q}$ output of flip-flop 71 is low, NAND gate outputs 47, 48 and 49 are maintained high. However, upon resetting flip-flop 71, the NAND gate 47–49 inputs coupled to output $\overline{Q}$ are high, and the gates respond to the logic of their other inputs. The output of NAND gate 87 becomes low when 24 pulses (96 input pulses) from the second stage of the binary counter 83 have been counted. This is the result of the logical addition by both of the NAND gate inputs coupled to the binary counter stage six "6" output and binary counter stage seven "7" output. Stage six 6 output is high during the ninth through sixteenth and twenty-fifth through thirty-second output pulse from stage two of the counter. Stage seven 7 output is high during the seventeenth through thirty-second output pulse from stage two 2 of the counter.

The resistor 86 and capacitor 86*a* form a delay network which insures the NAND gate 87 will not change its output stage at pulse 16 when the counter stages 6 and 7 are switching their logic states.

As long as NAND gate 87 output is high, NAND gate 45, 46 and 49 inputs coupled thereto are high. The contents of the shift registers 41–43 are serially moved toward the last shift register 43 Q output by each positive going edge of the pulse applied to the shift register 41–43 clock C inputs from NAND gate output 49. The NAND gate output 49 is the inverse of the pulse output 2 from stage two of the binary counter 83 and these inverse pulses serve to shift the stored information out of the shift registers 41–43. The shift register 43 output Q remains in the logic state of the particular bit shifted out for the time duration between negative going edges of binary counter stage two output pulses. Since the action of the NAND gate 49 is to invert the stage two output pulses while the other NAND gate 49 inputs are high, negative going pulse edges at the state two output becomes positive going pulse edges to the clock input of the shift registers 41–43. These positive edges cause shift register sequencing.

The pulses from stage two (output 2) of the binary counter are also inverted by either NAND gate 47 or NAND gate 48. The output of the NAND gate 47 is connected to the clock input of flip-flop 52. This flip-flop 52 has its D input connected to its $\overline{Q}$ output to form a toggled flip-flop, such that each positve going pulse edge at the clock input changes the state of the flip-flop from its previous stage.

The two outputs of this flip-flop 52 are each connected to buffer/drivers 54, and 55 which provide current for the $\overline{\text{DATA}}$ track of the magnetic tape head. Whenever one of these flip-flop 52 outputs (Q or $\overline{Q}$) is high, the other is low. Since the output of a buffer/-driver follows the same logic state as its input, current will flow between buffer/driver 55 output through the record head coil 60 and current limiting resistor 58, and into buffer/driver 54 output.

The direction of current flow is determined by the state of the flip-flop 52. Since a pulse edge changes the flip-flop state, it also causes change in current direction. This change in current direction causes a magnetic flux change in the record head and records a magnetic pulse onto the tape. NAND gate 48, flip-flop 53 and buffer/drivers 56 and 57 resistor 59 and record head coil 61 react similarly to drive the DATA track of the record head.

While recording data, only one of the two flip-flps 52 or 53 changes state during a state two output pulse. While the parity pulses are being recorded, both flip-flops 52 and 53 change state simultaneously. Parity is recorded after 24 data pulses, and it is NAND gate 45 and 46 inputs, coupled to NAND gate output 87 which lock out any further data and enable both flip-flops to be switched simultaneously, (see FIG. 5 for parity bits).

While recording data, either the output of the NAND gate 45 is high or the output of NAND gate 46 is high. Which output is high depends upon the output Q of the shift register 43 and hence this determines which NAND gate 47 or 48 is allowed to pass the binary counter stage two 2 pulses to the associated flip-flop 52 or 53. This electronic steering provides the method for determining onto which tape track a particular bit in the shift register will be recorded.

As may be seen the tape (sectional portion thereof) is shown at 30 in proximity to the coils 60 and 61. In this manner, the DATA and $\overline{\text{DATA}}$ tracks are recorded on the tape as the tape is stepped along in proximity to the coils.

Parity Signal or Bit (Pulse) Generation

The number of parity pulses recorded onto the tape at the end of a stroke is determined by the flip-flops 52–52. Three parity pulses are recorded on both DATA and $\overline{\text{DATA}}$ tracks simultaneously during steps 25 through 27 of the motor. If at the end of 27 steps the flip-flop Q outputs are high, indicating an odd number of pulses on the associated track, the reset pulse issued at the 28th step causes the flip-flops to reset resulting in a change of state and a change of flux.

If the flip-flops 52–53 Q outputs are low (their normally reset state) at the end of 27 steps, the reset pulse has no effect on the state of the flip-flop outputs, and no flux change takes place. Thus, the flip-flops act as an even/odd counter and determine the number of pulses recorded during a stroke.

Stepper Motor Drive Circuitry

In order to uniformly record pulses in a serial form on the magnetic tape, the tape must be moved across the tape head in a controlled fashion. In this circuit, a stepper motor 24 is used to move the tape in discrete increments, during which recording takes place. The stepper motor has two coils 24*a* and 24*b* and the direction of current in each of these two coils determines the shaft position of the motor.

The shaft is not constantly in rotation, but rather increments each time the coil current is charged in accordance with a predetermined schedule.

The binary counter 83 stage three 3 output drives the clock C input of flip-flop 93, and through inverter 91, the clock C input of flip-flop 92. Since these flip-flops are connected as toggle flip-flops, each positive going pulse edge at the clock input causes a change of state within the flip-flop. The positive going edge of the stage three pulse toggles flip-flop 93, while the negative going pulse edge is inverted to a positive edge through the inverter 91, and toggles flip-flop 92.

Since the only difference between the two stepper motor coils and their associated drive circuits is the sequence in which the current direction is switched with respect to the binary counter stage two pulse output 2, only one of the coil drive curcuits will be descriged in detail. The other circuit merely switches current direction one pulse later.

While flip-flop 70 output Q is low, flip-flop 92 output Q is also low, which causes the output of buffer 95*b* to be low, keeping transistor 95*f* turned off. Although the flip-flop 92 output Q is high, the NAND gate input coupled to flip-flop 70 is low, causing the NAND gate output 94*a* to drive the inverter output 95*p* low. This keeps transistor 95*k* turned off.

Since both transistors 95*f* and 95*k* are in their off state, no path is available for current to flow through the stepper motor coil 24*a* to ground. The resistors 95*c*, 95*d*, 95*l* and 95*m* in this drive circuit limit the current into the respective transistor bases.

When flip-flop 70 output Q bedomes high, NAND gate 94*a* output becomes low, driving buffer output 95*n* low and inverter output 95*p* high. Transistor 95*k* is thus turned on. Since flip-flop 92 output Q is low, inverter 95*a* output is high, turning transistor 95*e* on. Current now flows from positive potential through transistor 95*e*, energizing the stepper motor coil, and through transistor 95*k* to ground. When a positive going pulse edge switches the state of flip-flop 92, its output Q becomes high and the output $\overline{Q}$ becomes low. This effectively inverts the output logic states of the buffers 95*b* and 95*h* and the inverters 95*a* and 95*p*. Transistors 95*e*, 95*k* are turned off, while transistors 95*i*, 95*f* are turned on, causing the direction of the current flow in the stepper motor coil to change direction. The diodes 95*g* and 95*h* provide a path to ground for the negative voltage transient generated when the current direction in the coil is switched.

The current in one of the two coils 24*a* and 24*b* changes direction in the above manner in response to the positive or negative going edge of the binary counter stage three output pulses. Each change of current produces one step of the motor.

In a similar manner components 96*a*–96*p* perform the same function as described above.

System Reset

The output of NAND gate 87 becomes low after the twenty-fourth binary counter stage two 2 output pulse. This results in the output of inverter 88 becoming high. After the twenty-eighth pulse which indicates the completion of recording the parity pulses, the output of stage five 5 goes high. Thus both inputs to NAND gate 89 are high and the NAND gate 89 outputs drives the inverter output 90 high. This high line resets flip-flop 70 causing the resetting of the binary counter 83. It also resets flip-flops 92, 93, flip-flops 52 and 53 and causes all motor coils to become unenergized. The recorder circuit is now ready for another group of information to be recorded.

Reference should now be had to FIG. 3 which illustrates a typical RS latch flip-flop (LA) such as shown in FIGS. 2A and 2B. The circuit comprises NOR devices 98 and 99 coupled as shown.

When R is low and S is high (key depressed) Q is a high since the inputs to NOR gate 98 are both low. When R is high and S is high, then Q is low since one of the inputs to NOR gate 98 is low and the other is high.

In FIG. 4 there is shown diagrammatically the representation of a typical key member 100 representative of any one of a plurality of depressible key members, such as a shorthand machine. The key member has a portion 101 to be depressed (face thereof) and causes when depressed the key member 100, to pivot about 103, to simultaneously rotate bell crank 104 about pivot point 105, to move slide 107 about pin 106, to cause imprinting to take place on tape 108. A ribbon may be placed between the slide 107 and the tape to produce a mark on the tape.

The key member in rotating also causes a protrusion to engage normally open switch closure member 110 to force it closed against closure point 109. In this manner a typical switch such as SW1 may be operated from a keyboard. It should be realized that when a magnetic reed switch SW1– SW–24 is used, the key in rotating causes a magnet attached thereto to force closure of the switch contacts.

Capacitor 51 and resitor 50 produce a delay between pulses from binary counter 83 stage two 2 outut and the inputs to NAND gates 47 and 48.

This delay allows for information to be shifted out of the shift registers 41–43 and to arrive at the inputs of NAND gates 47 and 48 before the pulses from the output of binary counter state two.

In constructing the foregoing, flip-flops may be selected as an RCA type CD4013A, the binary counter (7 stage) may be selected as an RCA type CD4004A, and the shift registers may be selected as RCA type CD 4021A.

It should be understood that this is not limiting but is only disclosed for purposes of explanation. It would be apparent that other logic functions may be made to accomplish the purposes of this invention.

It should be realized that the end of stroke sensing 16 which is accomplished herein by diodes 62–1 through 62–24 can be implemented by a switch installed to indicate the return of the keys such as 101 to their initial underpressed state.

I claim:

1. A method of recording data representing the depression or non-depression of a plurality of keys of a keyboard of a shorthand machine by a user on a stroke by stroke basis, each stroke representing a word or part of a word said method comprising detecting and storing in parallel, information representing the depression or non-depression of a plurality of keys of a keyboard of a shorthand machine during the stroke by a user thereof, detecting when all the keys have been released by the user thereof upon completion of a stroke, transferring the information in parallel into a shift register after detecting when all keys have been released by the user upon completion of a stroke, generating shift signals to cause said shift register to serially shift out the information stored therein after the information has been transferred in parallel into the shift register, developing data and data signals from the information in the shift register, generating signal means to move a recording media to record the data and data signals being developed for recording, and recording the data and data signals on two different tracks of the recording media.

2. A method according to claim 1 in which either a data or a data signal bit but not both is recorded for a plurality of increments of the recording media movement.

3. A method according to claim 2 in which parity signals or bits representing a logical one are recorded simultaneously on both data and data channels for a plurality of increments of the recording media movement.

4. A method according to claim 3 in which the total number of signal bits applied in each channel is an even number.

5. A method according to claim 1 in which the recording media is stepped in a timed sequence with the development of the data and data signal bits.

6. A method according to claim 1 in which the input data comprises a group of bits whose logical state of either 1 or 0 indicates the key depression or non-depression.

7. A method according to claim 1 in which the recording media is stepped a predetermined number of increments of space prior to the recording of data and data bits thereon.

8. The method of claim 1 in which the recording media is a magnetic recording media.

9. A recording mechanism comprising a keyboard of a shorthand machine having a plurality of depressible keys, means for detecting and then storing one or more signals in parallel representing the depression of one or more keys of the keyboard after at least one key has been depressed, detecting when all keys have been released, means for transferring one or more data signals in parallel and storing the same in parallel in a shift register after the release of all keys have been detected, means for serially shifting the data signals out of said shift register after the data has been stored therein, means for generating data and data signal pulses from said data signals, a recording media for recording said generated data and data signal pulses, and means for moving said recording media to record said data and data signal pulses, said data signal representing the depression or non-depression of each of said plurality of keys of said keyboard.

10. A recording mechanism according to claim 9 in which said recording media is sequentially incremented while recording the pulses on said tracks.

11. A recording mechanism according to claim 10 in which the recording media comprises a magnetic recording media.

12. A recording mechanism according to claim 11 in which the recording media comprises a magnetic tape having at least two tracks.

13. A recording mechanism according to claim 9 in which the plurality of keys control a plurality of switches to detect key depression.

14. A recording mechanism according to claim 13 in which means is provided for stepping the recording media in increments to record data and data on the two tracks of the recording media.

15. A recording mechanism according to claim 14 including means for incrementing the recording media a predetermined number of increments prior to recording data and data on the recording media..

16. A recording mechanism according to claim 15 in which the recording media comprises a magnetic tape having two tracks.

17. A recording mechanism according to claim 9 in which parity signals are developed and recorded on both of the tracks of the recording media.

18. A mechanism according to claim 9 in which the pulses are applied to one but not both of the two tracks of the recording media.

19. A mechanism according to claim 18 in which the pulses represent logical ones or changes in flux.

* * * * *